United States Patent [19]
Montagu

[11] 3,959,673
[45] May 25, 1976

[54] OSCILLATION MOTORS
[75] Inventor: Jean I. Montagu, Brookline, Mass.
[73] Assignee: General Scanning, Inc., Watertown, Mass.
[22] Filed: Dec. 19, 1974
[21] Appl. No.: 534,583

[52] U.S. Cl. ................................... 310/38; 178/7.6; 318/686; 318/127; 350/6
[51] Int. Cl.² ......................................... H02K 31/00
[58] Field of Search ............... 310/36, 38; 318/127, 318/653, 686; 350/6; 178/7.6; 335/279

[56] References Cited
UNITED STATES PATENTS
3,343,012   9/1967   Scott.................................. 310/36
3,624,574   11/1971  Montagu......................... 335/279 X

*Primary Examiner*—R. N. Envall, Jr.

[57] ABSTRACT

According to one feature a bearing-free oscillation motor, e.g. for driving an optical scanner or chopper comprises a torsion shaft fixed at one end for rotational oscillation about its axis, a rotor support member substantially more rigid in bending than the torsion shaft attached to the free end of the shaft and extending back therealong, a magnetically interactive rotor rigidly joined to the support member at the mid-length of the torsion shaft, and a magnetically interactive stator adjacent the rotor for inducing rotational oscillation of the rotor, the torsion shaft and the rotor support member cooperating to provide a stiff system in bending. Preferably the rotor torsion shaft and rotor support member assembly are cooperatively constructed to restrain the rotor, in response to radial forces acting on it, to substantially translational motion without tilting of the rotor or the attached mirror or other device. According to another feature a torsion-shaft mounted rotor is divided into angularly spaced pole faces which, by vectorial combination effects, result in more uniform and decreased force on the rotor if the rotor is deflected from its desired position. According to another feature of the invention in such general type of oscillation motor a rotor motion pick-off coil has a predetermined stationary position aligned on the plane of symmetry bisecting the drive coil so as to be magnetically substantially symmetrical, regardless of rotor position, with the magnetic field effects that are inherently produced by the drive coil as it drives the rotor. Preferably this pick-up system has its modulated flux provided by stray flux from permanent magnets which bias the drive rotor.

14 Claims, 16 Drawing Figures

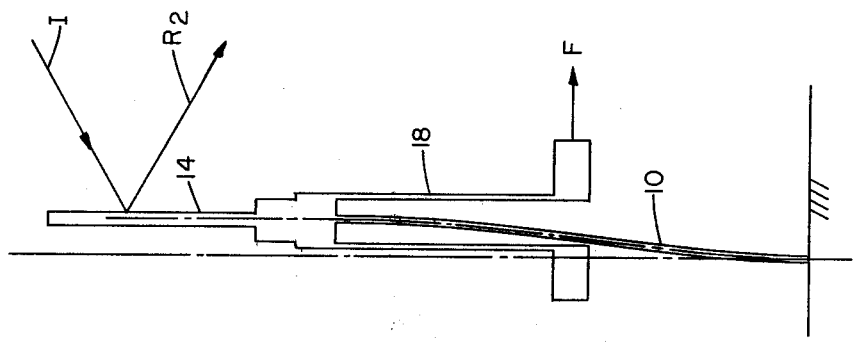
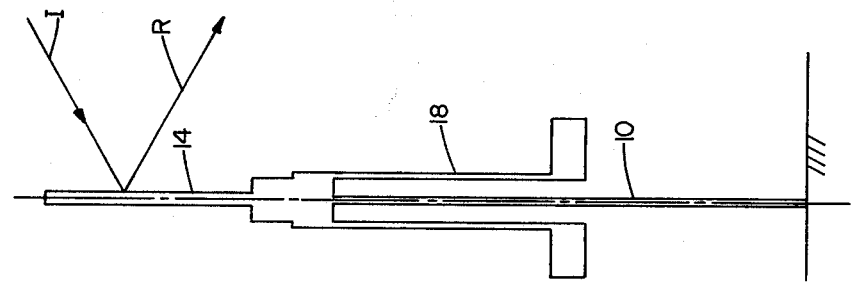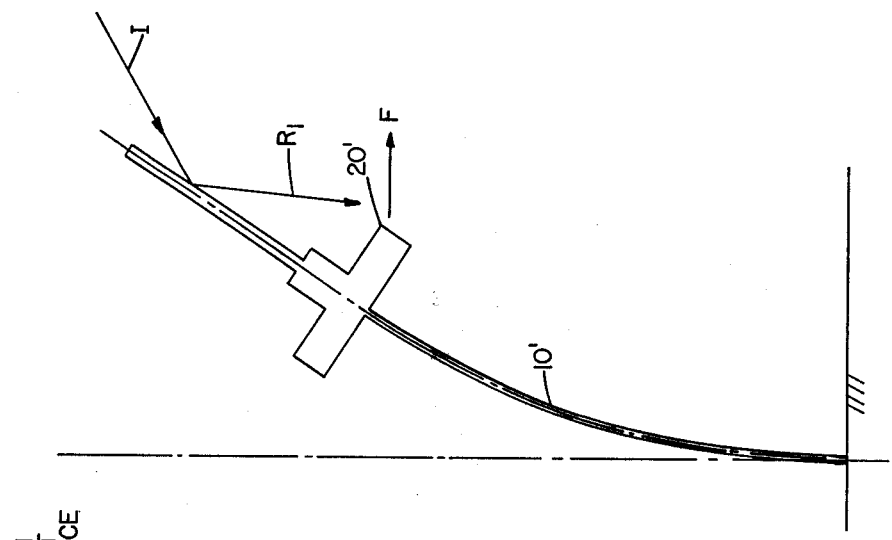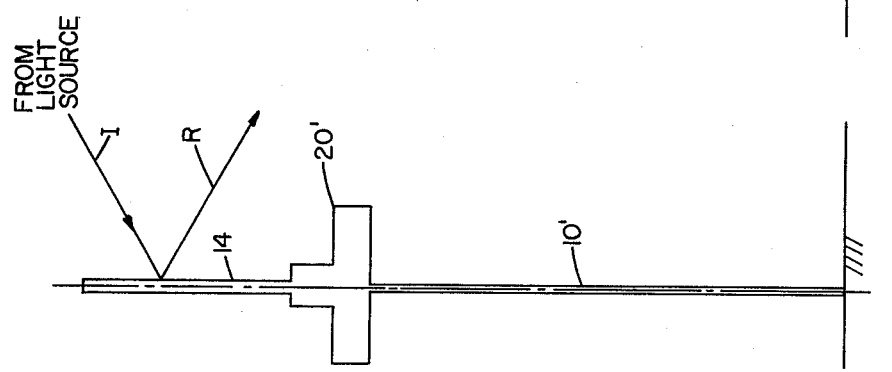

3,959,673

OSCILLATION MOTORS

BACKGROUND OF THE INVENTION

This invention relates to oscillation motors useful to deflect, scan, interrupt or chop beams of light, electrons or other streams of matter with little mass.

Conventional oscillation motors having torsion shaft-mounted rotors suffer numerous disadvantages: the rotors have limited excursion; their resonant frequency drastically decreases as their amplitude of excursion increases; when mounted at the end of a long torsion bar the rotors and accompanying mirrors or other devices are sensitive to cross motion and undesirable oscillations when subjected to mechanical vibrations or accelerations; and the motors operate at a very high Q factor and are generally difficult to tune.

Another problem of such electromagnetic motors, where the rotor is mounted on a flexible shaft, is that the electromagnetic forces which apply the operating torque to the rotor also behave as a second order spring in the radial direction of the rotor, tending to bend the rotor out of its desired symmetrical operating position relative to the stator. Reduction of the electromagnetic forces to reduce this displacement correspondingly penalizes the torque capability of the motor.

SUMMARY OF THE INVENTION

The invention provides a way to reduce or avoid the above disadvantages while providing a bearing-free, virtually infinite-life oscillation motor which requires no maintenance, may be oscillated up to frequencies above 10,000 cycles per second, may be adapted for oscillation amplitudes up to 30°, and may be mass-produced conveniently and economically.

A particular object of the invention is to provide a long life resonant scanner capable of operating over a wide range of amplitudes of excursion and of fixed resonant frequencies, of carrying a wide range of reflecting mirrors, chopper vanes, and the like, and of being self oscillating.

One aspect of the invention features a bearing-free motor of the kind mentioned having a torsion shaft fixed at one end and having a free end defining a mounting portion. A second rotor supporting member substantially more rigid in bending and torsion than the torsion shaft is attached to this mounting portion and extends back along the torsion shaft, being spaced radially from the shaft to permit unimpaired bending motion of the latter. A magnetically interactive rotor is rigidly joined to this second member at a point corresponding to the mid-region of the effective torsion shaft length while magnetically interactive stator means are located adjacent the rotor, with an appropriate air gap, for producing rotational oscillation of the rotor. The shaft and rigid rotor support member cooperate to provide an improved system of support, one in particular which is stiffer against radial motion of the rotor than would result, e.g., by mounting the rotor directly on the free end of a torsion shaft. Also, to the extent that forces of magnetic, dynamic or other origin cause radial displacement of the rotor, the new support system restrains such displacement to simple translation rather than the more complex and disturbing motion which involves tilting of the rotor when a rotor is mounted, e.g., on the free end of a torsion shaft.

In preferred embodiments: the rotor is mounted to the rotor support member at a point substantially equidistant from the free end and the fixed end of the torsion shaft; the assembly of the rotor, torsion shaft and rotor support member are cooperatively constructed to restrain the rotor, in response to radial forces acting on the rotor, to substantially translational motion without tilting effect; means are provided to apply driving force to the rotor at a frequency corresponding substantially to the natural oscillation frequency of the assembly (especially useful with a scanning mirror supported by the free end of the torsion shaft, the mirror and motor comprising a resonant scanning system), this motor preferably having means (preferably a pick up coil) for generating a signal related to the velocity of rotary motion of the rotor and for applying positive feedback of the signal to sustain resonant oscillating motion of the rotor. Preferably the relatively rigid rotor support member comprises a tube coaxial with the torsion shaft, with spacing between the shaft and inner surface of the tube to prevent contact during any bending of the torsion shaft. Also preferably the rotor is ferromagnetic, the stator includes permanent magnets to bias the rotor to an equilibrium position and a control coil applies driving flux to the rotor, preferably the rotor having four pole faces, the effective areas of adjacent pole faces being spaced at least 60° (most preferably 90°) from each other for reducing detrimental radial force effects on the rotor that are attendant with any radial displacement of the rotor.

According to another aspect of the invention more generally in a bearing-free oscillation motor having a torsion shaft-mounted rotor, the rotor is provided with the four pole faces arranged to magnetically interact with corresponding pole faces of the stator, alternate pole faces of the rotor being diametrically opposed to balance each other, and adjacent pole faces of the rotor being spaced at least about 60° (preferably 90°) apart for reducing detrimental radial force effects on the rotor that are attendant with any radial displacement of the rotor. In particular such an arrangement serves to make such force change more uniform, regardless of direction of the undesired radial displacement, and reduces the maximum value of such force change and hence reduces the tendency for further rotor displacement due to negative spring effects.

Other objects and features of the invention will be understood from the following description of preferred embodiments taken in conjunction with the drawings wherein:

FIGS. 3 and 3a are diagrammatic side views of a prior art optical scanner, illustrating, with exaggeration, the bending effects of a given lateral force on the rotor;

FIGS. 4 and 4a are side views similar to those of FIGS. 3 and 3a illustrating, with corresponding exaggeration the different effects caused by the force of FIG. 3a when applied to a scanner constructed according to the present invention;

Figure 2:
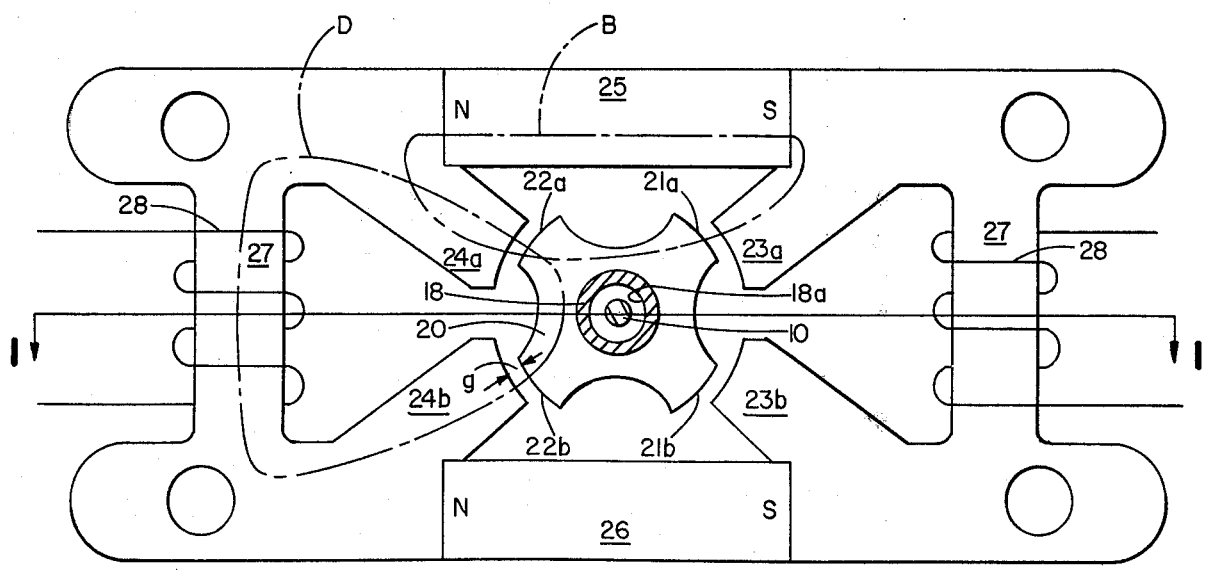
FIG. 2 is a diagrammatic plan view, partially in cross section, of the embodiment of FIG. 1 taken on line 2—2 thereof.
Figure 7:
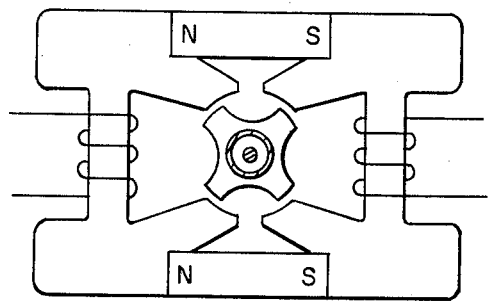
Figure 8:
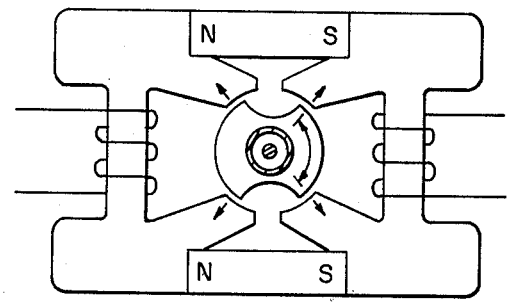
Figure 9:
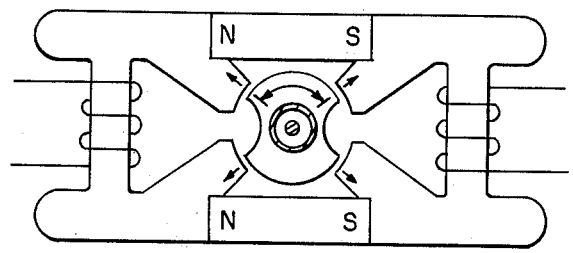
Figure 10:
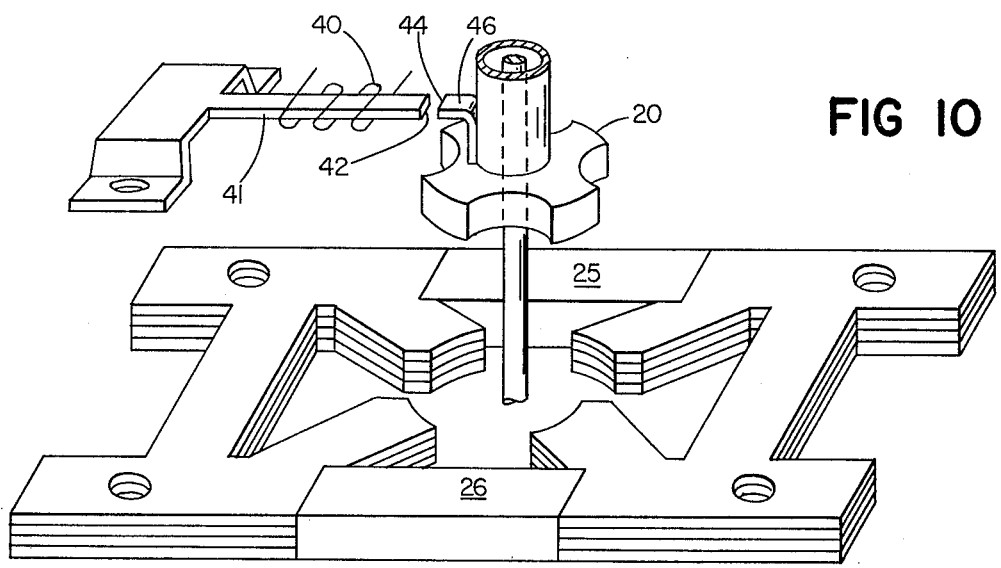
Figure 10A:
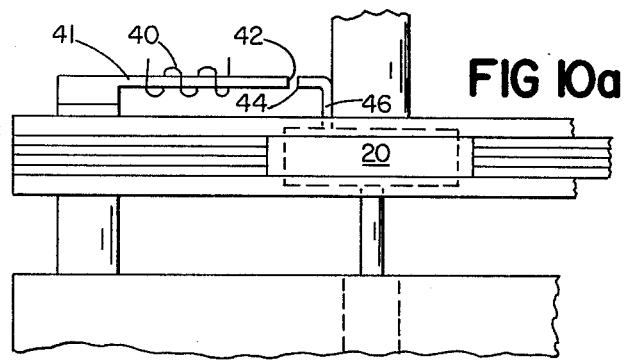

FIGS. 7, 8, and 9 are views similar to FIG. 2 of certain alternative rotor and stator configurations;

FIG. 10 is a perspective and partially exploded view of a resonant motor assembly together with a pick-off coil for positive feedback driving of the motor; FIG. 10a is a side elevation of the device of FIG. 10.

Figure 1:
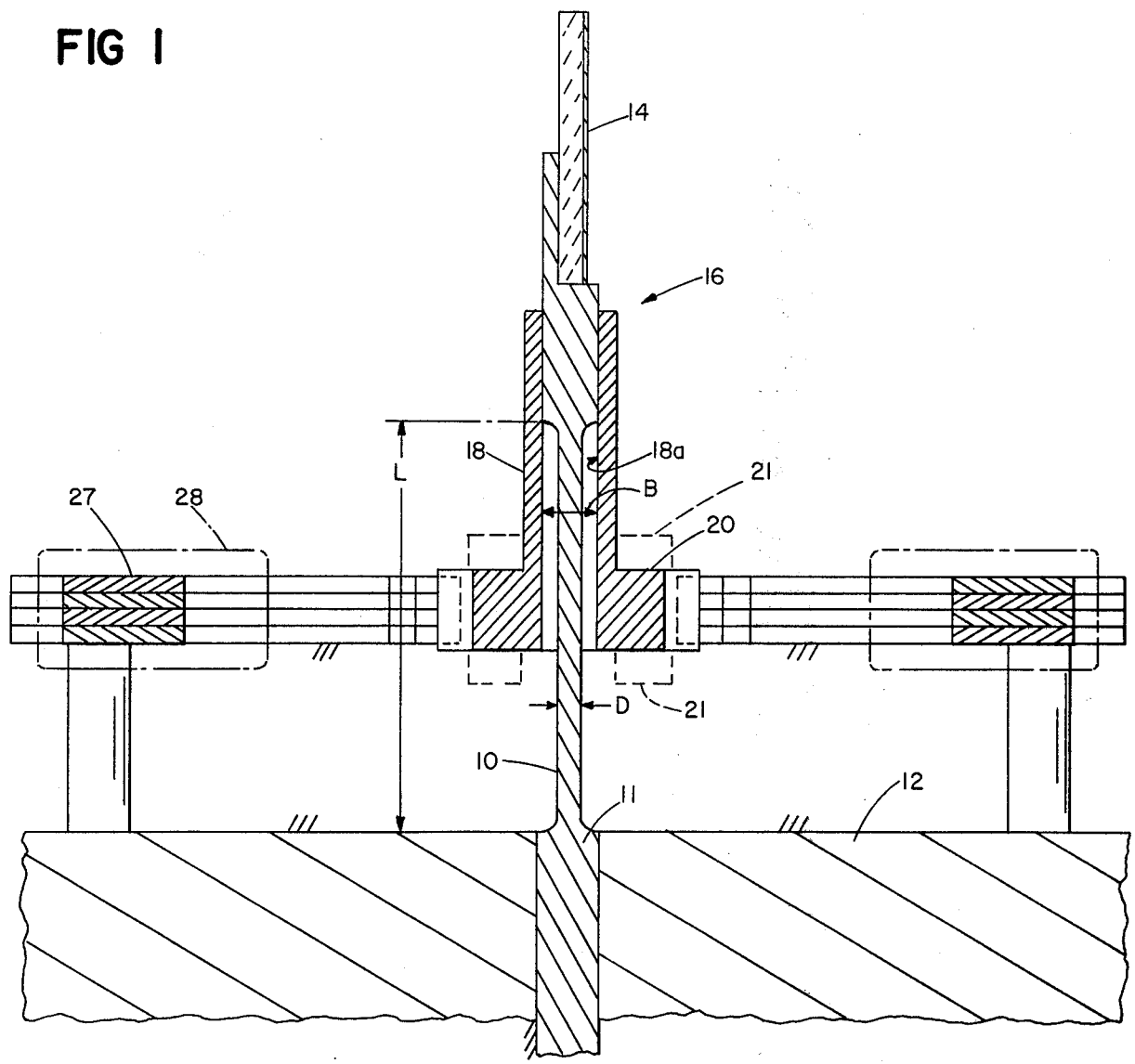
FIG. 1 is a side cross-sectional view of a preferred embodiment taken on line 1—1 of FIG. 2.
Figure 12:
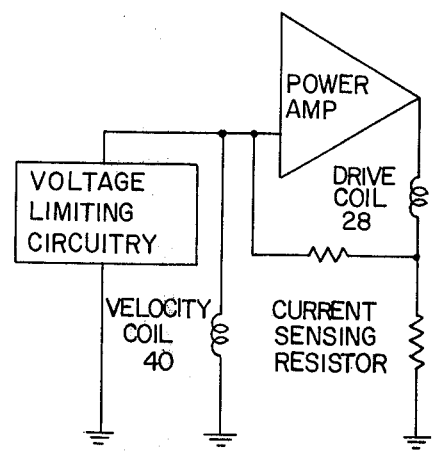
Figure 13:
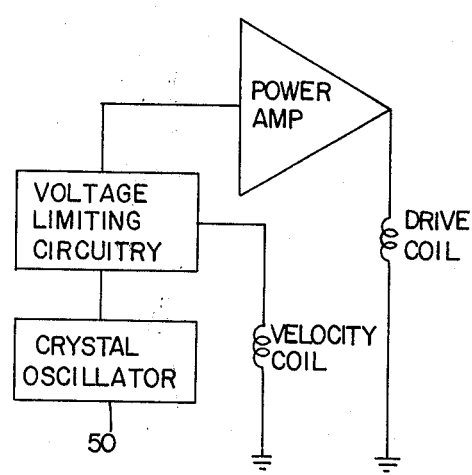
Figure 11:
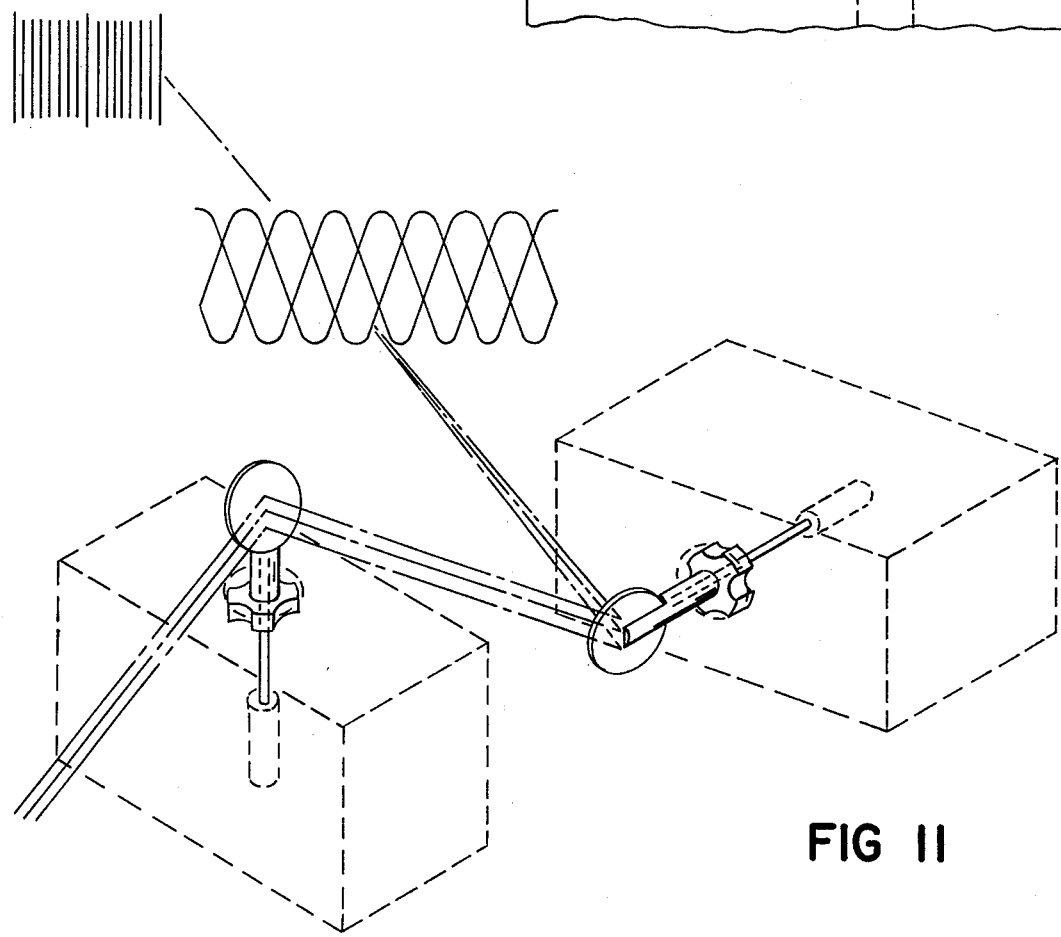

FIG. 11 is a perspective view of a scanning system employing two motors according to the embodiment of FIG. 1; and FIGS. 12 and 13 are block diagrams of drive circuitry for resonant motor systems according to the invention.

The preferred embodiments here to be described employ moving iron rotors which rotate at right angles to the flux paths from the stators. For information concerning the general construction of such motors, reference is made to applicant's prior U.S. Pat. Nos. 3,177,385 and 3,624,574, which are incorporated herein by reference. According to the broader aspects of the invention other configurations are of course possible as where the rotor moves parallel to the lines of flux or where the coils and other magnetic components have other arrangements.

Referring now to FIGS. 1 and 2, an elongated torsion shaft 10 has at one end a mounting hub 11 fixed against rotation to base 12. At the free end of the shaft, there is a mounting portion 16 to which a mirror 14 is joined. A coaxial rotor support tube 18, relatively rigid in comparison to shaft 10, is mounted at 16 and extends back along the torsion shaft, with the inner surface 18a of the tube spaced from the shaft 10 to enable unimpeded bending of the shaft 10 when subjected to radial displacement (see FIG. 4a).

A ferromagnetic rotor 20 is rigidly joined to tube 18 at a point equidistant from the ends of the torsion shaft.

The rotor 20 defines pole faces 21a, b and 22a, b which are spaced by air gaps g from corresponding pole faces defined by stationary ferromagnetic pole pieces 23a, b and 24a, 24b. The pole pieces cooperate with permanent magnets 25 and 26 and the rotor 20 to define biasing flux paths B; the pole pieces also cooperate wih ferromagnetic bridging portions 27 associated drive coils 28 and the rotor to define driving flux paths D, as generally described in the above referenced patents.

For purposes of an example the torsion shaft 10 of FIGS. 1 and 2 may be milled from a cylinder of high carbon steel ($E = 30 \times 10^6$ psi) with a length L of 0.6 in., and a diameter D of 0.052 in. Mounting portion 16 is notched to receive a mirror, fastened by epoxy cement, whose moment of inertia is small when compared with that of the rotor-tube-torsion shaft system. The mirror is centrally mounted on the axis of shaft 10 and is typically a circular disc, e.g., 0.50 in. in diameter and 0.040 in. thick.

Rotor support tube 18 and rotor 20 may be machined from one piece of low-loss nickel-iron steel alloy (50—50) such as Carpenter 49 and soft soldered to mounting portion 16. The inner diameter of the tube B may be 0.125 in. The various pole faces of the rotor are spaced apart such that the radial forces on the pole faces resulting from magnetic attraction are 90° apart. (For this effect the pole faces themselves are generally at spacings greater than 60°, the precise spacing being determined on the basis of the amount of rotor excursion and the arcuate extent of the stator pole faces, according to well understood design principles.)

As seen in FIG. 2, when the apparatus is assembled, uniformly sized air gaps are maintained between the pole faces of the rotor 20 and the stator pole pieces. However disturbances from magnetic, dynamic or other origin, may tend to cause change in the size of the air gaps, which in prior art construction can lead to serious malfunctions of the motor due to the negative spring effect of the magnetic system.

According to one feature of the invention, mounting of the rotor 20 on relatively rigid tube 18 helps to alleviate these effects. The tube 18 is at least 20 and preferably 100 times stiffer in bending than is the torsion shaft 10. To understand the effect of such mounting reference is first made to FIGS. 3 and 3a illustrating a prior art configuration in which a rotor 20' is attached to the free end of a torsion shaft 10'. Given radial force F on rotor (greatly exaggerated for purposes of illustration) would change the air gap by the amount of the displacement and would tilt the rotor 20 out of the plane of its stator, as shown. Note also the significant unwanted change in the direction of the reflected beam from R to $R_1$, caused by the tilting of the mirror. Referring now to FIGS. 4 and 4a, by attaching the support member 18 to the free end of the shaft and fixing the same rotor 20 to the member 18, as shown, the same force F on the rotor produces a considerably reduced displacement of the rotor 20 and avoids tilting of the mirror so that the reflected beam $R_2$ is not nearly so disturbed as was the beam $R_1$.

It should be appreciated that the length of member 18 may be varied without departing from the teachings of this invention. At its preferred length, one-half the effective length of the torsion shaft 10, the advantage is often maximized, but so long as the location of the rotor is in the mid region of the length of the torsion shaft, desirable effects of limiting displacement and tilt are achievable.

The combination of FIGS. 1 and 4 provides, in effect, a rotor mounting which may be as much as four times stiffer in radial bending than conventional shaft mounted designs without sacrificing torsion characteristics. Such mounting raises the frequency of the cross motion (pendulum) resonance (thus resisting pendulum motion with ambient vibrations which are of generally lower frequency) and thus reduces the tolerances within which reliable systems can be manufactured. The mounting also provides means for resisting acceleration effects on the rotor as in rocket launching of satellite systems or in rough usage situations. Also, in the case where the mass of the rotor is desired to be of relatively high value for the purpose of obtaining a relatively low rotary resonant frequency, this may be achieved by using the same structure as shown in FIG. 1 with the simple addition of an added mass 21, shown in dotted lines, the system being radially stiff enough to operate due to stiffening obtained by the novel mounting.

The rotor pole configuration of the invention is employed to further increase stability and versatility of the motor. In conventional rotor designs, see FIG. 6, pole faces on opposite ends of the rotor are exposed to tangential oscillating force and, because they are made of ferromagnetic material, are also exposed to radial force tending to attract the rotor out of its symmetrical position within the stator bore. In torsion shaft mounted designs, where bearings cannot maintain the rotor on its axis, any slight radial perturbation sets up an unstable situation, a second order negative spring, which may result in a serious malfunction. Since magnetic force varies with the square of the distance, when the rotor moves toward one stator element, radial attractive force to that element increases; since, simultaneously, the gap between rotor and stator on the opposite side increases, radial magnetic attractive force there decreases. The result is a net force on the rotor toward one pole which becomes increasingly more powerful, an unstable situation arises, and ultimately, contact results between the pole piece and stator element and oscillation ceases.

Figure 5:
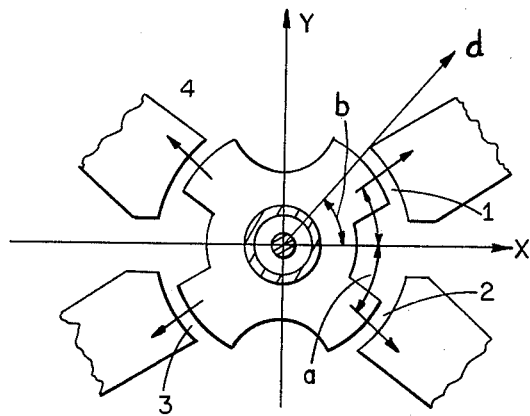
FIG. 5 is a diagrammatic plan view of a rotor according to the invention showing the angular spacing of the pole faces for reducing detrimental radial force effects on the rotor and on the torsion shaft when the rotor is subject to radial displacement.

To reduce this problem, rotors of the instant invention, as seen in FIGS. 2 and 5, have four pole faces spaced considerably apart. In the embodiment the air gaps g are designed as uniform and both coils 28 are employed to drive rotor 20, this configuration thus serving to balance the radial attractive forces absent any displacement.

Figure 6:
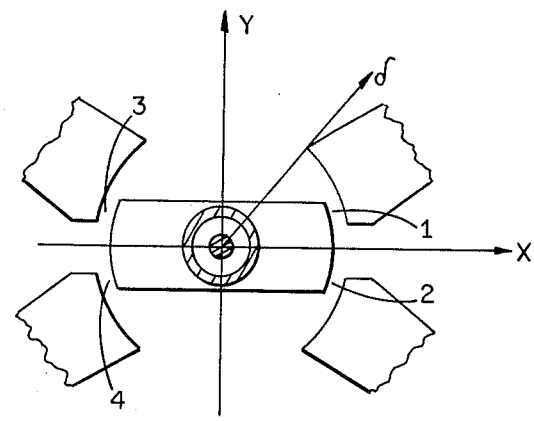
FIG. 6 is a view similar to that of FIG. 5 of a conventional rotor for purposes of comparison with FIG. 5.

With this design any given radial displacement of the rotor, regardless of the direction of the displacement, results in the same change in the force conditions, and this change is substantially less than the maximum force change that would result with the construction of FIG. 6.

Referring to FIG. 5 assume a displacement of magnitude $d$ in any given direction, angle $b$. Angle $a$ represents the angle of orientation of the force on each rotor pole face relative to the X-axis of symmetry. The air gaps are identified by numerals 1, 2, 3 and 4.

With the deflection $d$,

Gap 1 decreases by $d \cos(b-a) = d(\cos b \cos a + \sin b \sin a)$

Gap 3 increases by $d \cos(b-a) = d(\cos b \cos a + \sin b \sin a)$

Gap 2 decreases by $d \cos(b+d) = d(\cos b \cos a - \sin b \sin a)$

Gap 4 increases by $d \cos(b+d) = d(\cos b \cos a - \sin b \sin a)$

If $a = 45°$ (the optimum case of spacing between axis of symmetry and pole faces of between about 30° and 60°)

Then gap 1 decrease is $d \frac{\sqrt{2}}{2}(\cos b + \sin b)$
3 increase " " "
2 decrease " $d \frac{\sqrt{2}}{2}(\cos b - \sin b)$
4 increase " " "

The force imbalance between gaps 1 and 3 is $$\Delta F_{13} = F_1 - F_3 = F_o/(d_o-d_1)^2 - F_o/(d_o+d_1)^2$$

$d_o$ = nominal gap value
$d_1$ = change in gap at 1
$F_o$ = magnetic force coefficient $$\Delta F_{13} = F_o \left[ \frac{(d_o+d_1)^2 - (d_o-d_1)^2}{(d_o^2-d_1^2)^2} \right] = \frac{4 F_o d_o d_1}{(d_o^2-d_1^2)^2}$$

assuming $d_1$ is a small fraction of $d_o$ $$d_o^2 - d_1^2 \approx d_o^2$$

Therefore $\Delta F_{13} = \frac{4F_o d_1}{d_o^3} = K_o d_1$

Where $K_o$ is a magnetic stiffness coefficient

Similarly $\Delta F_{24} = K_o d_2$

The resultant of these inbalances in the X-direction is $$\Delta F_x = \Delta F_{13} \cos a + \Delta F_{24} \cos a$$
$$= K_o \cos a \ (d_1 + d_2)$$

Therefore under the conditions of $a = 45°$.

$\Delta F_x = K_o(d/2) (2 \cos b) = K_o d \cos b$

In other words:
the resultant in the X-direction is the same as if a force $K_o d$ had occurred in the direction of the original displacement $d$.

Now, compare with what would happen if $a=o$ (i.e., the rotor pairs are contiguous) as shown in FIG. 6:

We would still have $$\Delta F_x = (\Delta F_{13} + \Delta F_{24}) \cos a$$
$$= \Delta F_{13} + \Delta F_{24} \quad \text{for } a = o$$
$$= K_o (d_1 + d_2)$$

but now
$d_1 = d \cos b$ $d_2 = d \cos b$ $\Delta F_x = 2 K_o d \cos b$ which is as though a force of $2K_{od}$ had occurred in the direction of the original displacement d. TWICE AS LARGE AS FOR THE CASE $a = 45°$.

It will be understood from the foregoing that in the event of radial displacement of the rotor, the magnitude of the vectorial average of the change of the air gaps is essentially independent of the direction of the radial displacement and equal to about 70 per cent of the maximum value that would occur with the use of un-spaced adjacent pole pieces, so that the magnitude of the vector addition of the changes of the radial forces at the air gaps is also essentially independent of the direction of the radial displacement and equal to about fifty per cent of the maximum value that would occur with the use of un-spaced adjacent pole pieces.

Where the pole faces are disposed so that the radial forces on them are somewhat off of the perpendicular, i.e., ± 30°, desirable effects are still obtained, though decreasing with increase in the deviation from perpendicular.

The principles just described are, as noted, related to the direction of the radial forces, and not dependent upon the particular edges of the rotor and stator pole faces being employed. For example the rotor-stator arrangement of FIGS. 7, 8, and 9 are equally operative according to the invention.

The motor that has been described is particularly useful as a resonant driver, for instance as a resonant scanner as shown in FIG. 11, where the unit operates at a set frequency.

According to one embodiment, as shown in FIG. 10 and 10a, a velocity coil 40 is positioned to detect the motion of the rotor, and this velocity signal is used as positive feedback as shown in FIG. 12 to a power amplifier to control the frequency of the voltage applied to the drive coil (or coils) 28 of the motor. Thus the natural frequency of rotary oscillation of the mechanical system determines the frequency of operation. This frequency can be appropriately varied by changing the mass of the components, etc.

In another embodiment, referring to FIG. 13, a crystal oscillator 50 is chosen to oscillate at a fixed frequency compatible, e.g., with the frequency of television scan, and the motor is constructed with a predetermined natural frequency to substantially match that of the oscillator. In this case the velocity coil may be employed to control the amount of positive feedback, thus to regulate the amplitude of the excursion of the system.

Referring further to FIG. 10 the velocity coil or tachometer 40 is located on top of the motor, the coil having a ferromagnetic core 41 defining a pole face 42 which interacts with the pole face 44 of a ferromagnetic projection 46 mounted on and in magnetic continuity with the rotor. The coil 40, core 41 and stationary supporting elements are aligned in the longitudinal plane of symmetry of the stator, (thus to avoid carrying any flux attributable to the drive coil 28, and being isolated therefrom to avoid forming a magnetic short circuit for the drive coil). The core and projection assembly gather stray magnetic flux from the biasing permanent magnets 25 and 26, this flux being modulated by the variation of the reluctance produced by the motion of the projection 46 relative to the pole face 42.

Referring to FIGS. 4a and 11, the advantages of the invention of limited deflection and tilting of the mirror, even though mounted by a cantilevered torsion bar, have significant advantages in providing high speed, uniform scans in a unit free of bearing problems.

Mathematical analysis shows that the radial stiffness of the unit is expressed generally by $$P/d_t = 12 \, EI/L$$

where $P$ is a force acting radially on the rotor, $d_t$ is the displacement of the point of attachment of the support member 18 to the free end of torsion bar 10 (as well as of the rotor 20), $E$ is Young's modulus of elasticity, $I$ is the moment of inertia of the cross section of the torsion bar and $L$ is the length of the cantilever to the point of attachment. In contrast the radial stiffness of a conventional design per FIG. 3 of the same length and moment of inertia is expressed $$P/d_t = 3EI/L$$

Of also great importance is the fact that the rotor mirror assembly does not tilt but translates when the rotor is subjected to a force, from either magnetic or dynamic origin.

As is known with regard to simple cantilever beams (see FIG. 3) the tip angular deflection of a beam due to a load P located at its tip is (according to Elements of Strength of Materials — Timoshenko and MacCullough, Van Nostrand Co., Inc. — Page 182)

$$\theta_1 = PL^2/2 \, EI$$

The maximum angular deflection created by a moment ½PL at the tip of a beam of length $L$ (where the rotor of FIG. 4 is located) is according to this reference $$\theta_2 = (PL/2) \times (L/EI)$$

The sum of both angles is zero, therefore by beam analysis it is shown that the rotor and the rigidly attached mirror will translate and not tilt.

It will be understood that embodiments shown are given as examples and that variations are possible within the spirit and scope of the claims.

What is claimed is:

1. A bearing-free oscillation motor, for example for driving an optical scanner or chopper, comprising:
    a torsion shaft fixed against rotation at one end for rotational oscillation about its longitudinal axis and having a free end defining a mounting portion;
    a rotor support member substantially more rigid in bending than said torsion shaft attached to said mounting portion and extending therefrom back along said torsion shaft;
    a magnetically interactive rotor rigidly joined to said rotor support member at a point corresponding to the midregion of the effective length of said torsion shaft; and
    a magnetically interactive stator means located adjacent said rotor with an air gap therebetween for cooperation with said rotor for inducing rotational oscillation of said rotor;
    said torsion shaft and said rotor support member cooperating to provide a stiffer system in bending in a direction of change of said air gap than would result by mounting said rotor directly on said free end of said torsion shaft.

2. The motor of claim 1 wherein said rotor is mounted to said rotor support member at a point substantially equidistant from said free end and said fixed end of said torsion shaft.

3. The motor of claim 1 wherein the assembly of said rotor, said torsion shaft and said rotor support member are cooperatively constructed to restrain said rotor, in response to radial forces acting on said rotor, to substantially translational motion without tilting effect on said rotor relative to said stator means.

4. The motor of claim 1 including means to apply driving force to said rotor at a frequency corresponding substantially to the natural oscillation frequency of the oscillating assembly comprising said torsion shaft and all parts mounted thereon.

5. The motor of claim 4 in combination with a scanning mirror supported by the free end of said torsion shaft, said mirror and motor cooperating to provide a resonant scanning system.

6. The motor of claim 4 further comprising means for generating a signal related to the velocity of rotary motion of the rotor and means for applying positive feedback of said signal to said control means to sustain resonant oscillating motion of said rotor.

7. The motor of claim 6 wherein said means for generating said signal comprises a stationary ferromagnetic piece having a pick-off coil wound therearound and a pole face, a pole member mounted to move with said rotor and arranged to magnetically interact with said pole face to produce said signal in said pick-off coil.

8. The motor of claim 1 wherein said relatively rigid rotor support member comprises a tube disposed coaxially with said torsion shaft, with spacing provided between said torsion shaft and the inner surface of said tube to prevent contact therebetween during permitted bending of said torsion shaft.

9. The motor of claim 1 wherein said rotor comprises ferromagnetic material, said stator means includes permanent magnet means for biasing said rotor to an equilibrium position and said stator means includes control means for applying driving flux to said rotor.

10. The motor of claim 9 wherein said rotor has four pole faces arranged to magnetically interact with corresponding pole faces of said stator means;

the magnetic system of said motor designed such that with constant air gap between all the respective rotor and stator pole faces, approximately equal radial forces are applied to each of said rotor pole faces, said forces increasing and decreasing with respective decrease and increase of said air gap;

alternate pole faces of said rotor being diametrically opposed, and adjacent pole faces of said rotor being spaced at least about 60° apart for improving the radial force effects on the rotor attendant with any radial displacement of said rotor.

11. The motor of claim 10 wherein the pole faces of said rotor are arranged such that the radial forces in the pole faces resulting from magnetic attraction are 90° apart.

12. A bearing-free optical scanner comprising:
a torsion shaft fixed against rotation at one end for rotational oscillation about its longitudinal axis and having a free end defining a mounting portion;
a rotor support member in the form of a tube substantially more rigid in bending than said torsion shaft attached to said mounting portion and extending therefrom back along said torsion shaft, coaxial therewith with spacing for shaft bending provided between said torsion shaft and the inner surface of said tube;
a magnetically interactive rotor rigidly joined to said rotor support member at a point corresponding to the midregion of the effective length of said torsion shaft, said rotor comprising four pole faces having midpoints sapced approximately 90° apart about the axis of said torsion shaft;
a magnetically interactive stator means having pole faces corresponding with those of said rotor, with airgaps between respective rotor and stator pole faces, said stator including magnetic means for biasing said rotor to an equilibrium position, said stator means cooperating with said rotor for inducing rotational oscillation in said rotor; and
means for generating a rotor drive signal having a frequency substantially correlated to the natural frequency of the overall oscillating system to provide resonant oscillating motion of said rotor;

said torsion shaft and said rotor support member cooperating to provide a stiffer system in bending in the direction of change of said airgaps than would result by mounting said rotor directly on said free end of said torsion shaft.

13. In an oscillation motor comprising a ferromagnetic rotor driven by a drive coil of a stator, the drive coil adapted to apply a modulating drive flux to said rotor through a predetermined stationary magnetic flux path which includes stationary ferromagnetic pole pieces and pairs of corresponding rotor and stator pole faces, said motor including rotor motion pick-off means which includes a ferromagnetic rotary element turning with said rotor and a stationary detection coil associated with a stationary ferromagnetic element, said rotary and stationary elements of said pick-off means having corresponding pole faces that have varying reluctance dependent upon displacement of said rotor relative to said stator, and means to apply magnetic flux through said stationary and rotary elements of said pick-off means to be modulated by said varying reluctance of said pick-off elements thereby to generate a voltage in said detection coil having a value at least partially dependent upon the motion of said rotor, that improvement wherein said detection coil has a predetermined stationary position, and said detection coil being aligned relative to said position to be substantially symmetrical, regardless of rotor position, with the magnetic field effects present at said position that are inherently produced by said drive coil as it generates said drive flux for said rotor, the magnetic structure of said stator including said drive coil being symmetrical about a plane of symmetry passing through the axis of the rotor, and said pick-up coil and associated stationary element being longitudinally aligned in said plane of symmetry.

14. In an oscillating motor according to claim 13 which includes a stationary permanent magnet that applies biasing flux to said rotor, the improvement wherein said means to apply magnetic flux through said stationary and rotary elements of said pick-off means comprises means positioning said stationary element in a manner to pick up stray flux from said permanent magnet.

* * * * *